United States Patent
Neilsen

[15] 3,686,569
[45] Aug. 22, 1972

[54] CAPACITIVE PICK-UP MEANS FOR AN ELECTRICAL TACHOMETER

[72] Inventor: Tage S. Neilsen, Los Angeles, Calif.

[73] Assignee: Rite Autotronics Corporation, Los Angeles, Calif.

[22] Filed: May 1, 1970

[21] Appl. No.: 33,827

[52] U.S. Cl. .................................. 324/126, 324/170
[51] Int. Cl. ......................... G01r 1/20, G01p 3/48
[58] Field of Search...324/17, 18, 126, 149, 72, 72.5, 324/169, 170

[56] References Cited

UNITED STATES PATENTS

| | | | |
|---|---|---|---|
| 1,931,225 | 10/1933 | Heaton | 324/18 |
| 2,245,604 | 6/1941 | Peters | 324/18 |
| 2,357,138 | 8/1944 | Seeley | 324/126 X |
| 2,760,157 | 8/1956 | Dexter | 324/126 X |
| 3,396,339 | 8/1968 | Miram | 324/126 |

Primary Examiner—Rudolph V. Rolinec
Assistant Examiner—Ernest F. Karlsen
Attorney—Robert E. Geauque

[57] ABSTRACT

Herein described is an electrical tachometer which is responsive to electrical signals applied to selected spark plug wire of an automobile. The contact comprises a capacitive coupling contact which is wrapped around the exterior insulation of the spark plug wire. A clamp-on arrangement of the capacitive coupling contact includes a pair of contactor clips which are secured to the outer wire and held by an outer shield to shield, the signals picked up by the capacitive connections from outside noise environment. Electronic circuitry is responsive to the signals received by the capacity contactors and includes a signal shaping network to provide the necessary signal-to-noise discrimination. The relatively noise-free signal is then converted to a D.C. signal which is then applied to a meter.

4 Claims, 7 Drawing Figures

Patented Aug. 22, 1972

INVENTOR.
TAGE S. NIELSEN,
BY
Robert E. Beaupre
ATTORNEY.

Patented Aug. 22, 1972

INVENTOR.
TAGE S. NIELSEN,
BY
Robert E. Granger
ATTORNEY.

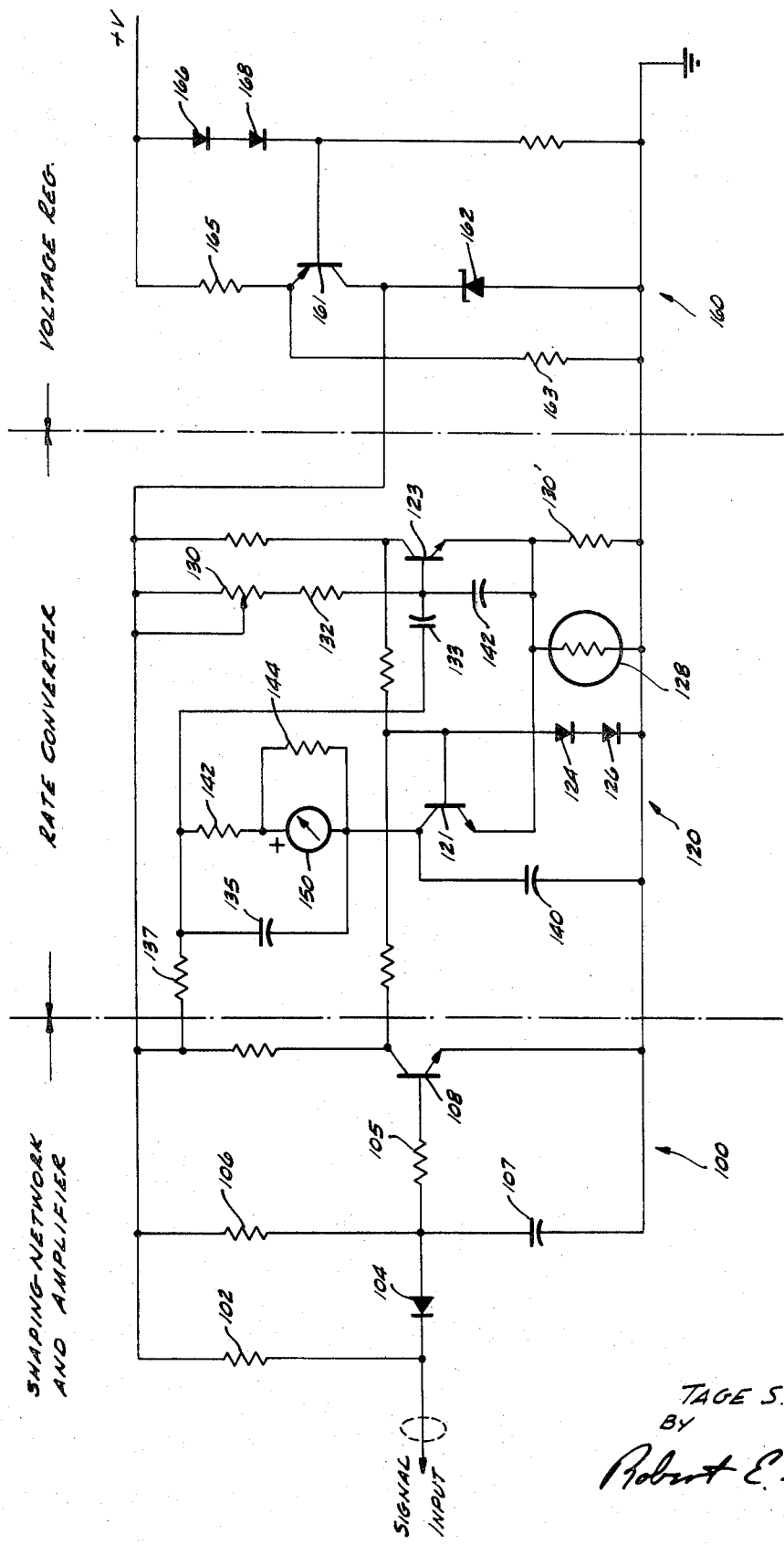

CAPACITIVE PICK-UP MEANS FOR AN ELECTRICAL TACHOMETER

BACKGROUND OF THE INVENTION

1. Field of the Invention

This invention relates to electrical tachometers and more particularly to a novel and improved electrical connection device for coupling the electrical connection of the tachometer and its associated circuitry to a selected spark plug wire of the internal combustion engine of the vehicle. Further, the invention relates to novel and improved circuitry for connecting the relative high noise signal to a D.C. level for operating the tachometer or the like.

2. Discussion of the Prior Art

Heretofore, prior art devices used to connect electrical tachometers into internal combustion engines were physically connected into the one end of the engine's distributor coils in the ignition system. Such prior art devices have many disadvantages. For example, in order to attach an electrical tachometer to an internal combustion engine physical removal of certain component parts of the ignition system is required to attach the electrical components and electrical lead wires into the ignition coil.

Too, these particular types were susceptible to noises generated from within the ignition system. For example, the large amount of electrical power and currents generated in the ignition coil and distributor and other components thereof are always picked up by the electrical lead wires leading to the tachometer. This is undesirable because the signal-to-noise ratio would be quite high causing the tachometer to be erroneous in its readout and insensitive to small amounts of changes reducing the position readout generally desired by the motorist.

It has been found that it is more desirable to connect the tachometer to a single spark plug wire and generates therefrom electrical signals indicative of the RPMs of the engine. As is well known, for each revolution of the crankshaft of the engine is directly proportional to the number of times the firing of a single spark plug. In prior art devices which remove the signal from the ignition coil, a transformation must be made from the number of firings that the ignition coil must naturally make for a four, six or eight cylinder engine to the number of revolutions of a crankshaft of an engine. On the other hand, when the signal is received directly from the single spark plug wire, no transformation need be generated. The frequency of the pulses generated by the firing of a spark plug can be reduced to a digital signal which is directly proportional to the revolutions per minute of the particular crankshaft.

Even though the electrical connections then will not be made directly into the distributor coil, a large amount of noise is now generated from the other spark plug wires and thus an undesirable signal-to-noise ratio is still found to reduce the precision of the tachometer.

SUMMARY OF THE INVENTION

Briefly described, the present invention overcomes the disadvantages of the prior art systems by providing a device which electrically couples the tachometer to a single spark plug wire. By this invention, electrical connections are made directly on the outside of the insulated wire and thus the need to dismantle portions of the ignition system is unnecessary. A shield is provided around the contactors which detect the electrical signals of a single spark plug wire to reduce the noise ratio of adjacent spark plug firings at an acceptable level.

In accordance with the present invention, an electrical clip, sometimes comprised of an electrically conductive material, is disposed about the insulated portion of a spark plug wire. A clip is connected to a coaxial cable, for example which as the outside shielding thereof connected directly to a ground. The lead from the contactor includes an enlarged portion, which will later be used to connect to the electrical shield of the contacting device.

Disposed about the electrical contactor is an insulated sleeve which has recesses therein adapted to receive the spark plug wire and the electrically conductive capacitive coupling clip. Means are included for securing the two insulated members together for easy access to and from the spark plug wire without disconnecting the spark plug wire from the engine. A metallic shield is then disposed partially around the outside of the insulative member and particularly in the area of the capacitive contactors to which shields the capacitive connection from outside noise environments generated by adjacent spark plug wires, the ignition coil, distributors, and other electrical components in the engine. The shielding sleeve may have a recessed area therein which is adapted to receive a conductive raised portion of the ground lead wire which is connected directly to the outside shielding of the coaxial cable or shielded cable. The enlarged portion is adapted to be easily forced into detent in the insulative member in order to securely hold the two together. The shield contacts the enlarged conductive portions to ground the shield.

Electrical circuitry is included in the present invention to shape the signal from the spark plug to provide a constant signal shape. As mentioned, the tachometer is not amplitude responsive but frequency responsive. Therefore, it is desirable that all signals received from the spark plug have a constant amplitude. Therefore, a signal shaping network is included to provide necessary signal-to-noise discrimination with an output pulse of constant amplitude.

This signal is then applied to a rate converter which converts the frequency of the pulses to a D.C. level representation thereof which is indicative of the rate at which the occurrence of the pulses is received. By the inclusion of a constant current generator, the signal is then applied to a meter readout which provides an analogue indication of the revolutions per minute of the engine to which the invention is connected.

BRIEF DESCRIPTION OF THE DRAWINGS

These and other features and advantages will become more apparent to those skilled in the art when taken into consideration with the following detailed description, wherein like reference numerals indicate like and corresponding parts throughout the several views and wherein:

FIG. 6 is an electrical schematic drawing illustrating the signal conversion network.

DESCRIPTION OF THE PREFERRED EMBODIMENT

Figure 1:
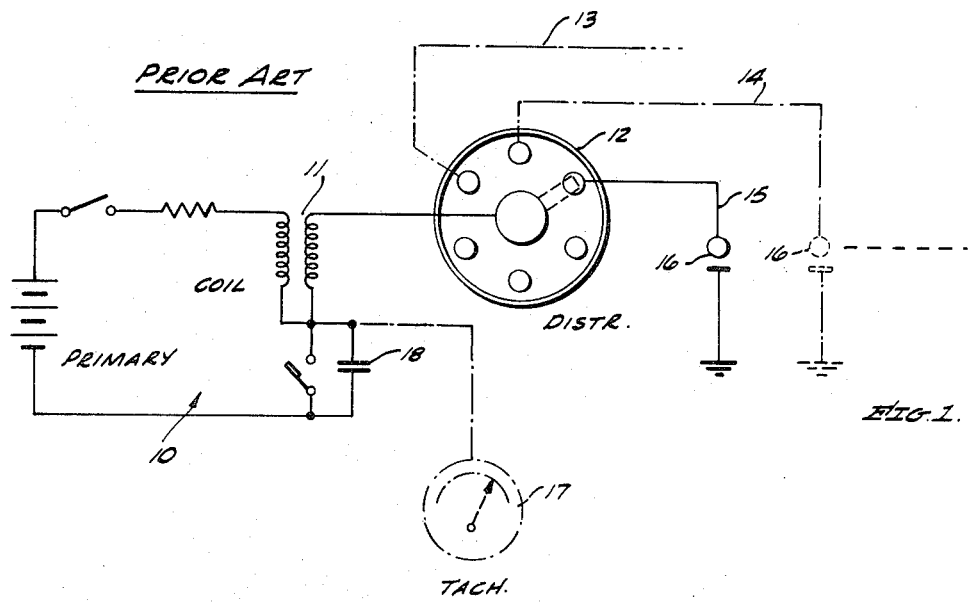
FIG. 1 is an electrical schematic drawing illustrating the connections of a tachometer in the prior art system.

Turning now to a more detailed description of this invention, attention is first turned to the prior art system shown in FIG. 1. The electrical ignition system 10 in the prior art includes an ignition coil 11 which is connected directly into a distributor 12. A number of spark-plug leads, shown for example by the numerals 13, 14 and 15, connect the spark-plugs 16 to the distributor 12. A tachometer 17 is then coupled between the condensor 18 and the ignition coil 11. This system characterizes the disadvantages due to excessive noise environments hereinbefore set forth.

Figure 2:
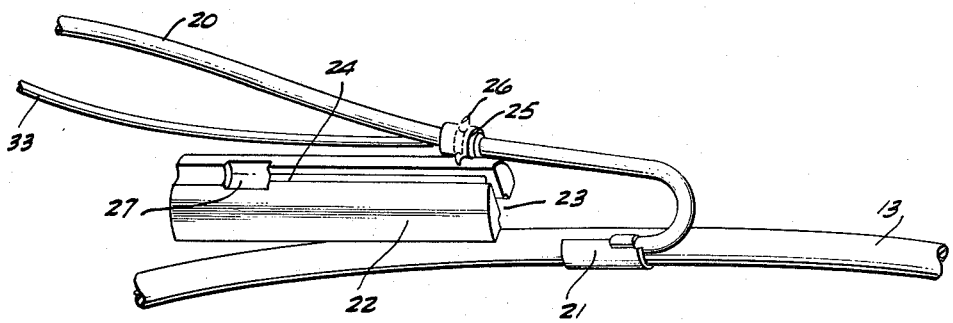
FIG. 2 is a perspective view illustrating the capacitive coupling of the tachometer to a spark plug wire.

As mentioned, the present invention embodies a novel connection of the tachometer 17 to a selected one of the sparkplug wires, as shown in FIG. 2. In this system, the sparkplug wire 13 is used as an example. The electrical lead 20 is connected to a metal contact 21. The electrical lead 20 may, for example, be an insulated wire and the metal contact 21 is relatively thin and somewhat tubular in shape, in a manner that it may be disposed around all or a portion of the spark-plug wire 13. As mentioned hereinafter, the signal supplied for the distributor 12 through the spark-plug wire 13 is a high voltage signal and to such a degree that electrical energy is transmitted to the metal contact 21 by capacitive coupling.

To secure the metal contact member 21 to the sparkplug wire 13, a semicircular insulated member 22 is provided which includes a somewhat circular groove 23 which is adapted to fit over the spark-plug wire 13 and may include a recessed portion therein to receive the metal contact 21, as will be discussed further in connection with FIG. 3. The insulated member 22 has a longitudinal groove 24 along the top portion thereof which is adapted to receive the electrical lead 20 therein when doubled back from the contact member 21 over the insulated member 22. A metallic contactor 25 which includes a number of protruding spikes 26 therefrom is adapted to be disposed into an enlarged portion 27 of the longitudinal groove 24. These spikes 27 are adapted to be imbedded into the material of the member 22.

Figure 3:
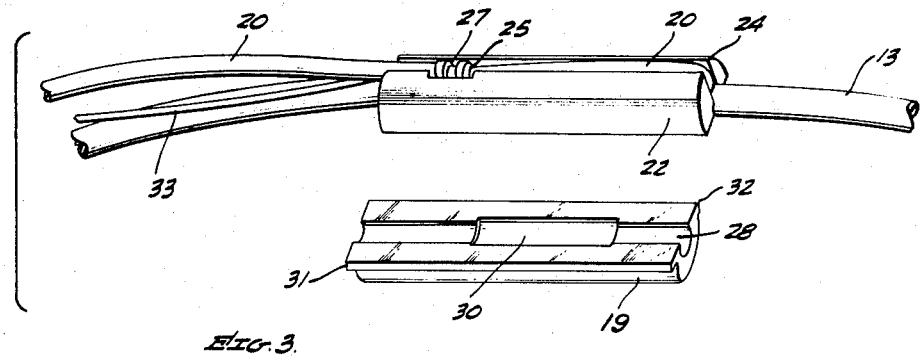
FIG. 3 is a perspective view showing the apparatus connecting the capacitive connector to the spark plug wire.

Referring now to FIG. 3, it can be seen that the lead 20 will fit snuggly into the groove 24 when the insulated member 22 is fitted over the spark-plug wire 13. A second insulated member 19 has a groove 28 therein which matches the radius of the spark-plug wire 13. An enlarged recess 30 within the groove 28 is adapted to confine the metal contact 21. The outside radius of the member 19 has a somewhat smaller dimension than the member 22 and defines a pair of extending ridges 31.

Figure 4:
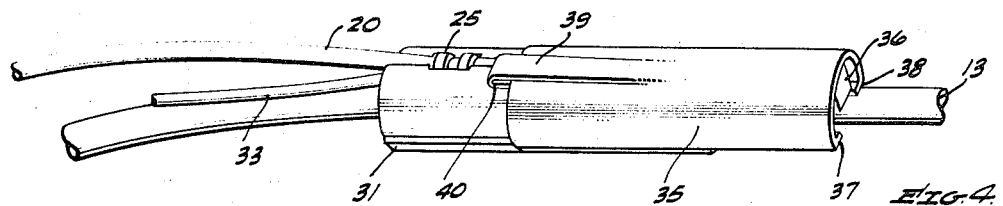
FIG. 4 is a perspective view showing the connection of the noise shield to the spark plug wire connection.

A ground lead 33 is grounded in a suitable manner to the vehicle to which this invention pertains and is electrically coupled to the enlarged metallic contactor 25. With reference to FIG. 4, there is shown a semicircular or semitubular shield 35 which has an inside radius adapted to fit the outside radius of the insulated member 22. The shield 35 makes physical contact with the contactor 25 and thus effectively shields the capacitive coupling of the metal contact 21 to the spark-plug wire 13.

To facilitate secure holding of the shield 35 in place, a downwardly depending edge 36 is constructed to contact against the edge of the insulative member 22. A pair of lips 37 and 38 are formed inwardly on the edges of the shield 35 and are adapted to slidably fit over the ridges 31 and 32. A clip 39 is formed on the opposite end of the shield 35 and has a downwardly protruding edge 40 which snaps over the opposite end of member 31. Clip 39 is formed by a pair of cuts into the shield 35 which urge clip 39 downwardly towards the member 31 and against the contactor 25.

Figure 5:
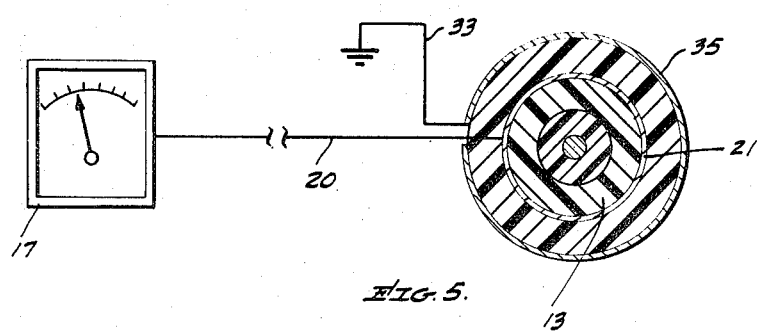
FIG. 5 is a cross-section taken through the wires and connections of the spark plug wires and capacitive connections thereto.

FIG. 5 illustrates somewhat schematically the principal of capacitive coupling and shielding in accordance with the principles of this invention. The lead 33 is coupled to a ground which is any appropriate place on the engine. The other end of lead 33 is coupled to the shield 35 which is shown as being entirely around the wire 13. For convenience and ease of connection, though, the shield 35 and the capacitive contact 21 need only be around one-half of wire 13 to be effective as shown in FIG. 4. Finally, the shield 21 is shown as being connected by lead 20 to the tachometer 17.

Figure 7:
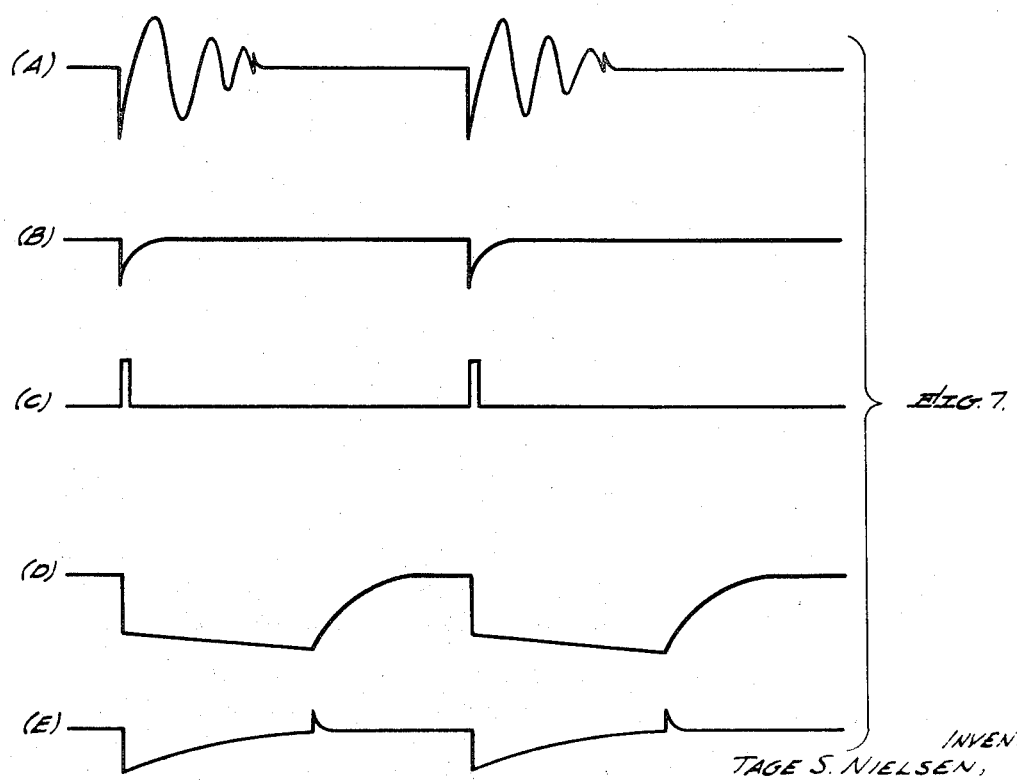
FIG. 7 is a graph illustrating the electrical signals along different portions of the schematic shown in FIG. 6.

With reference to FIG. 6, the electrical signals from the monitor is of varying shapes and amplitude depending on the actual spark-plug firing voltage and the overall ignition system. The graph A set forth in FIG. 7 is illustrative of the received signal. Furthermore, the signal generates different noise signals, which are caused by the high voltages required in firing additional subsequent spark-plugs.

A signal shaping network and amplifier 100 are included to provide the necessary signal-to-noise discrimination with an output pulse therefrom which has a uniform and consistent amplitude. The network 100 is comprised of resistor 102 and diode 104. The diode 104 is a rectifier which allows only the negative portion of the signal received from the spark-plug wire to enter the network 100. FIG. 7, graph B is an example of the negative pulse passed by network 100. Resistor 102 provides a reverse bias equal to the supply voltage for diode CR1. Thus any signal entering must overcome this threshold voltage level.

The resistor 106 and the capacitor 108 form a low-pass filter with resistor 106 also providing forward bias to a transistor 108. Transistor 108 operating in the common emitter configuration is then normally ON with the saturation voltage appearing at the collector thereof.

The pulse set forth in graph B of FIG. 7 is then applied to a rate converter circuit 120 which converts the AC pulses TO A DC voltage level. The converter circuit 120 is comprised of the two transistors 121 and 123, the circuit utilizes positive feedback in such a way that the two transistors 121 and 123 tend toward opposite states, one OFF, one ON. The transistors basically form a monostable multivibrator, however, with the difference that 121 operates in a constant current mode.

The constant current is generated by resistor diodes 124 and 126 which maintain a constant voltage across resistors 128 and 130 when transistor 121 is ON, thus causing a constant emitter current to flow in transistor 121.

Considering the stable state transistor 123 is ON, being forward biased by resistors 130 and 132, and transistor 121 is OFF. When a negative input pulse appears at transistor 108, this transistor will turn OFF and hereby causing transistor 121 to turn ON via resistor 105. Regeneration will now occur and the astable state between transistors 108 and 121 will exist for a time period determined by the time constant relationship between capacitor 133, resistors 132 and 130. The constant current flowing in transistor 121 will now charge the capacitor 135 to a voltage which will be a function of the repetition rate which the capacitor 135 is being charged, or in other words, the voltage will be the average value of the pulse train appearing at the collector of transistor 121. The value will represent the repetition rate since all other factors affecting the average voltage value are of a constant value. Resistor 137 controls the voltage level to which the feedback capacitor 133 is being discharged. This voltage level, a function of resistor 137 and constant current is fixed, insures the time period transistor 121 is ON remains constant, and is independent of the voltage generated across capacitor 135.

Capacitors 140 serve as by-pass capacitors preventing mistriggering of the monostable multivibrator from any noise signals appearing within the overall circuits.

Resistor 128 being a thermistor is coupled in parallel with resistor 130 and will compensate for any change in the constant current due to temperature changes.

The average voltage across the capacitor 135 is being measured and indicated by the meter 150. The meter correctly calibrated indicates the average voltage directly expressed in terms of repetition rate or for a tachometer engine revolutions per minute. Resistors 142 and 144, respectively, are series and shunt resistors for the meter allowing the use of any type of meter with different full scale current values and internal meter resistances.

A regulated power supply 160 provides a constant supply voltage to the circuit allowing the external battery source to vary from 6 to 16 volts with only a negligible effect on the accuracy of the conversion. Transistor 161 serves as a preregulator generating a constant current for a voltage regulator zener diode 162. Resistor 163 acts as a compensating pass-current resistor equalizing for the slight increase in the current flowing through resistor 165 which primarily is due to the dynamic impedance of two diodes 166 and 168. This impedance will increase the forward voltage drop across the diodes as the input voltages vary from 6 to 16 volts, for example, hereby increasing the current through resistor 165.

Having thus described but one preferred embodiment of this invention, what is claimed is:

1. A device for capacitively coupling an electrical connection to an insulated wire comprising:
   a thin semitubular electrical contact adapted to be disposed about the outer surface of the insulated wire, said contact being coupled to the electrical connection for capacitively coupling the electrical connection to the insulated wire;
   a first semicircular insulative member having a first longitudinal groove therein adapted to receive the insulated wire, said first member having a recess which communicates with said groove to receive said semitubular electrical contact;
   a second semicircular insulative member including a second longitudinal groove adapted to receive the insulated wire, said first and second semicircular insulative members adapted to cooperate to substantially completely encase the insulated wire; and
   means for securing said first and second members together, said means including a metal semitubular element to substantially cover said first member to shield the capacitive coupling from outside noises, said means also includes fastening means to contact said second member and bind such to said first member.

2. The device as defined in claim 1 wherein:
   a lead wire attached to said contact; and
   said second member including a recess on its exterior surface thereof which is adapted to receive an enlarged connection portion upon said lead wire, said enlarged connection portion adapted to be coupled to an electrical ground reference.

3. The device as defined in claim 2 wherein:
   said fastening means includes longitudinal ridge means located upon said second member, said metal semitubular element including inwardly extending lip means, said lip means being adapted to engage said ridge means when said element is disposed over said first member.

4. The device as defined in claim 3 wherein:
   said metal semitubular element includes stop means located adjacent one end thereof, said stop means being adapted to abut an edge of said first member, said element including a spring biased clip located adjacent the free end of said element opposite said stop means, with said element disposed about said first member and said stop means being in contact with one edge of said first member said spring biased clip being movable inwardly to contact the opposite edge of said first member.

* * * * *